Dec. 14, 1926.
A. J. CAWLEY
1,610,423
DAYLIGHT PROJECTING SYSTEM
Filed Jan. 22, 1921
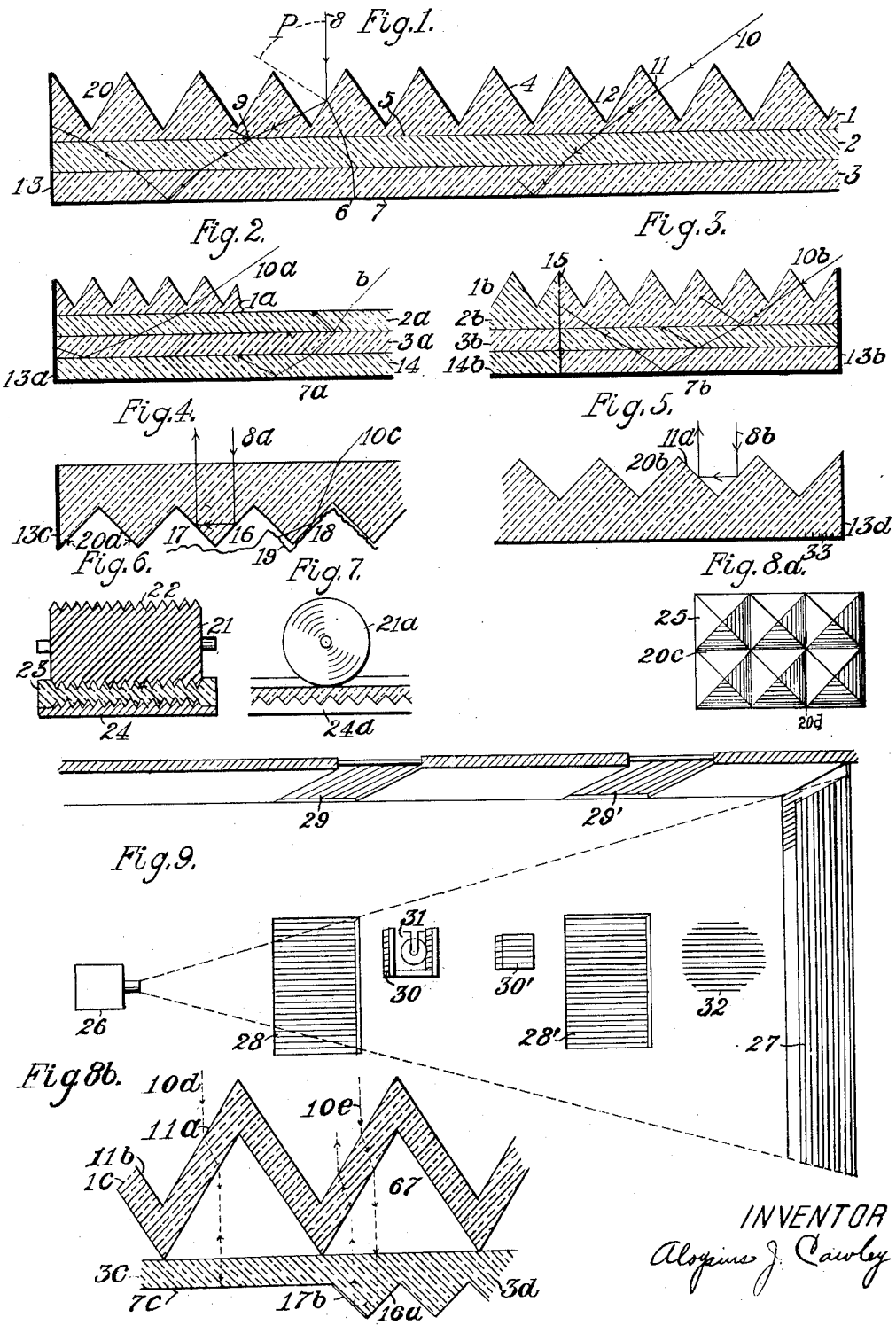
INVENTOR
Aloysius J. Cawley Patented Dec. 14, 1926.

1,610,423

UNITED STATES PATENT OFFICE.

ALOYSIUS J. CAWLEY, OF PITTSTON, PENNSYLVANIA.

DAYLIGHT-PROJECTING SYSTEM.

Application filed January 22, 1921. Serial No. 439,286.

The invention relates generally to the production of daylight pictures by means of specially polarized light; more particularly, it involves a specially designed projection screen so designed that when polarized light is used, the image is easily discernible upon it. Such screens are also capable of dissipating light which does not arrive at the screen from the direction of the projector. Light from the projector, therefore, possesses two advantages over all other, namely, that due to the plane in which it is polarized and that due to the position of the projector itself.

A further object of the invention is the design of a theatre that will greatly enhance the production of daylight pictures by means of polarized light. The invention also provides means whereby a picture that is practically invisible to the naked eye, will be rendered visible.

Reference is to be had to the accompanying drawings forming a part of this specification, in which like characters of reference denote corresponding parts in all the views, and in which, Figure 1 is a cross-sectional view of a special type of projection screen capable of rendering images upon its surface clearly visible when projected by means of polarized light.

Figure 2 is a cross-sectional view of a modification of the screen shown in Figure 1.

Figure 3 is a cross-sectional view of another modification of the screen shown in Figure 1.

Figure 4 is a cross-sectional view of a picture screen that will reflect light from the projector, while transmitting that coming from the sides of the theatre; it is unnecessary to silver it.

Figure 5 is a cross sectional view of a screen similar to that shown in Figure 4, but differing from it in having the ridged surface next to the audience.

Figure 6 is a cross-sectional view of a device for manufacturing screens simple.

Figure 7 is an elevational view of a device similar to that in Figure 6, but designed to impress ridges on either side of the screen that are in a direction at right angles to each other.

Figure 8a is a view of the surface, farthest removed from the audience, of a screen similar to that shown in Figure 4. This screen, however, is provided with two series of ridges running at right angles to each other on the same surface of the screen.

Figure 8b is a cross-sectional view of a composite screen.

Figure 9 is an interior view of a theatre specially provided with polarizing means. whereby daylight projection by means of polarized light is greatly facilitated.

It is proposed to take advantage first of the fact that light, when polarized in a certain plane, may be so acted upon by a special projection screen that it will be turned back from the screen to the spectators, while all other light is largely dissipated or absorbed. Secondly, light coming from the direction of the projector is returned to the spectators by specially designed screens. Consequently, light that both comes from the direction of the projector and is also properly polarized will have supreme advantage over all other light in being observed by the audience. The screens are designed to largely absorb or dissiplate light not possessing these advantages.

The light is polarized in the projector in a certain plane, which may be the vertical plane. It is a well known fact that when polarized light meets a transparent medium at its polarizing angle, it will largely pass through this medium and will not be appreciably reflected therefrom. Figure 1 represents a cross-sectional view of a projection screen, which has on its surface fine ridges whose sloping sides make exact angles with the plane of the screen itself. These angles are so selected that when a ray of light 8, coming from the projector, reaches the screen, it strikes one of the sloping sides at an angle P, which is the polarizing angle for the particular medium of which the screen is composed. In the drawing P is shown as 57 degrees, which is that characteristic of a very common kind of glass. It will be found that for a certain position of the plane of polarization (determined by rotating the polarizer in the projector) that the light will pass entirely through the screen, while light polarized in any other plane will be more or less reflected, so that light polarized in a plane ninety degrees removed from that in which the refracted light is polarized, will be totally reflected from the surface of the sloping side. The course of ray 8, therefore, if it be polarized in the proper plane, will be into layer 1, to the surface 5 of the layer 2, through layers 2 and 3. The lower surface of layer 3 is silvered or otherwise rendered reflecting, and reflects the ray back to the eyes of the observers in front. Since ordinary light is polarized in practically all planes, it is perfectly obvious that only a small proportion of it is polarized in the same plane as that of the projector. Therefore, the light coming from the direction of the projector, but not from it, will not be polarized in the proper plane except for a very small proportion, and will therefore, be mostly reflected at the surface, and pass into layer 1 to surface 9, thence into layers 2 and 3 to surface 6 and there be again reflected by surface 7; finally whatever is left of it will be absorbed by an absorbing medium 13, which may be black paint, black velvet, or the like. In short, such light will be dissipated and will not reach the audience. It is to be noted that the ridges 4 should be sufficiently fine that they will not interfere with the distinctness of the picture as at present projected in practice. In fact, they may be made so fine that they cannot be observed at the ordinary viewing distance of a motion picture. The invention is not limited to this, however, as it includes all sizes of ridges, or pyramids, if the latter are used.

Layer 2 in Figure 1 is of greater density than 1 and 3 is of greater density than 2. If desired, layers 2 and 3 may be omitted, and the lower layer of 1 silvered. Light ray 10, coming at an angle to the picture screen, such as from a lamp, or window, at the wall of the theatre, passes through surface 11 into medium 1, and thence into 2 and 3, and is thence reflected at an angle to the left; it is greatly dissipated, as shown, during its passage by reflection from the surfaces of the different layers, both in passing to 7, and on its way therefrom to the exterior. A large part of it will be imprisoned by total reflection and sent to the left, and finally completely absorbed by 13. One can readily see that the only light that is reflected in its entirety from 7 is that which comes from the projector, due both to the position of the projector and the plane in which its light is polarized. In order that all light coming from the projector may be at the polarizing angle, the screen may be arranged in a curved form, i. e., as part of the circumference of a circle with the projector located at the center thereof.

Figure 2 represents a cross-sectional view of another modification of the invention, in which layer $2^a$ is of greater density than $1^a$, and $3^a$ still greater than $2^a$, and also 14 still greater than $3^a$. As ray $10^a$ enters the screen, it passes successively through layers $1^a$, $2^a$, $3^a$ and 14; as it does this, there is great possibility of its being totally reflected, by sooner or later meeting one of the surfaces at an angle greater than the critical angle. In case of such imprisonment by total reflection, it is reflected repeatedly until it reaches the absorbing medium $13^a$, where it is completely extinguished. A part of the light from ray $b$ illustrates this clearly. If desired, the ridges on the upper layer may be dispensed with. This is shown to the right of Figure 2, where ray $b$ is seen passing into such a screen. One can readily see that even though imprisonment by total internal reflection may not occur to all of the light, still a great proportion of it is wasted by reflection at the different layers.

The layers may be disposed in any order desired with regard to density, for instance in Figure 3 still another modification is shown wherein the middle layer $3^b$ is less dense than either $2^b$ or $14^b$. Ray $10^b$ passes inwards to surface $7^b$, is reflected and finally absorbed by layer 15, but before reaching the latter, its energy may be completely dissipated, due to repeated reflections, some of which are shown, and to absorption in the glass itself. This figure also illustrates the fact that the screen may be made in sections, if desired, such as those bonded by absorbing layers $13^b$ and 15; each section is thus provided with absorbing layers similar to 15, which may be composed of velvet, or dark paint.

The foregoing illustrates the fact that light not coming from the projector, due to the plane of its polarization, or angle of incidence at the screen, or both, will be sent through a longer path in the screen than that coming from the projector itself, and have its energy destroyed by absorption in passing through excessive lengths of glass and also in the absorbing layer itself. The remainder of such light, if any, is reflected at an acute angle from the surface of the screen, and does not reach the observers.

There is also another form of screen, such as that illustrated in Figures 4 and 5, which consists of one medium, and which does not require the use of silver to obtain a reflecting surface. Figure 4 is a cross-sectional view of a screen whose angles $20^a$ are right angles. The invention, however, covers any angle, which may even be the polarizing angle. The light ray $8^a$, coming from the projector, enters the screen, and meets the surface 16 at an angle of 45 degrees, which is greater than the critical angle of the medium, and it is, therefore, totally reflected, and comes in contact with the other surface at 17 at 45 degrees also. It is again totally reflected here, and is sent back to the theatre in a direction approximately parallel to that in which it entered the screen. By selecting a medium whose critical angle is as near forty-five degrees as possible, it is obvious that light coming to the screen at an angle less than a right angle, will not be totally reflected. For instance, ray 10ᶜ comes to the screen at an acute angle, and is totally reflected at 18, but strikes the opposite surface at an angle that is complementary to its angle of incidence, and is therefore greater than the critical angle; it is, of course, not totally reflected at the latter surface, but passes largely through, and is absorbed by any light absorbing medium which may be placed behind the screen, such as the black velvet curtain 19, which is shown here. It is thus seen that light coming from the projector is sure to be totally reflected back to the audience, while that coming from the sides of the theatre, such as from doors or windows, is absorbed. Since the ridges, as previously mentioned, are to be fine, the screen, when illuminated by the projector light, will have the appearance of a frosted silver mirror; furthermore, the ridges will break up any direct reflection, such as that of an image of the theatre in front. Consequently, if the theatre is arranged so that there are no lights or windows at or near the rear to speak of, they being disposed rather at the sides of the theatre, daylight pictures can be readily produced. If the angle 20ᵃ between the ridges is, for any reason, not 45 degrees, the projector light should be polarized, as described in connection with Figure 5, but this is not absolutely necessary.

Figure 5 shows a modification differing from the above in that the ridged surface is located next to the audience. The angles shown between the ridges are preferably right angles. Here, however, since the reflection takes place in the less dense medium, there is no critical angle, and as a result, no total reflection as in the case of Figure 5, and ray 8ᵇ is only partially reflected from 11ᵃ, and some of the light enters the body of the screen. In order to compensate for this, the projector light should be polarized in such a plane that it will be largely reflected at the surface indicated. The proper plane of polarization to accomplish this is readily found by simply rotating the polarizer in the projector until the position of greatest brightness is obtained. The light coming from the windows, or the like at the sides of the theatre should be polarized in a plane ninety degrees different from that of the projector light, as described in connection with Figure 9. This will greatly aid such light in passing into the body of the screen and being absorbed so as not to interfere with projection. A black coating is shown at the sides and back of the screen at 13ᵈ, which may be paint or black velvet. A number of indentations 33 should be provided in the rear surface of the screen, in order to prevent reflection of rays striking it at an angle.

Figure 6 illustrates a very easy manner of manufacturing any of those screens. 24 represents a cross-sectional view of an endless band, such as those used in making celluloid films, with the difference that its surface is provided with the desired configurations which are to be impressed in the surface of the screen. The screens may be made of any transparent material desired, such as glass, celluloid, or gelatine. The material is poured on to the surface 24 while in a plastic, or semi-plastic, or liquid condition, and when sufficiently hard, it is stripped off. The screen 23 formed in this case would have but one ridged surface, such as those shown in any of the previous figures. However, if it is desired to place ridges or the like on both faces, a roll 21, having the proper configurations 22 may be used in conjunction with 24. The resulting screen 23 is thus provided with ridges on both surfaces running in parallel directions. Figure 7 illustrates that the screen may also be provided with ridges that are at a right angle or less to each other as regards their direction. For this purpose, the roll 21ᵃ similar to 21 is turned around through an angle of ninety degrees. The ridges in 24ᵃ run in the same direction as those in 24; here, however, as a diversion, their sides are at right angles to each other. Also if desired, 24 or 24ᵃ may have plain surfaces, the configurations being impressed by rolls 21 or 21ᵃ.

The steel band may be provided with two series of ridges running at right angles to each other, and the screen formed from it will have a large number of small pyramids on its surface, as shown at 25 in Figure 8ᵃ. 20ᶜ and 20ᵈ indicate two grooves running at right angles to each other produced by the ridges in the surface of the steel band or the like.

A composite type of screen embodying many of the features of the foregoing is shown in Figure 8ᵇ. It differs from those described in that layer 1ᶜ is bounded by parallel sides throughout. An air space 67 is provided between 1ᶜ and 3ᶜ or 3ᵈ as shown. Light ray 10ᵈ, properly polarized and coming from the projector, strikes surface 11ᵃ preferably at the polarizing angle and, enters 1ᶜ, and passes through it and air space 67, and subsequently transparent layer 3ᶜ. It is reflected by the silvered or like surface 7ᶜ, and proceeds backward along practically the same path which it entered, finally reaching the audience in front. The silvered surface just mentioned may be dispensed with by using the screen shown in 3ᵈ, whose surfaces 16ᵃ and 17ᵇ are at right angles to each other. These surfaces, of course, form a vast number of ridges, or pyramids on the screen as previously described. In such case, light ray 10ᵉ passes through 1ᶜ, 67 and enters 3ᵈ. Here it meets surface 17$^b$ at an angle greater than the critical angle, and is totally reflected to surface 16$^a$, where it is again totally reflected, passing through 3$^d$, 67 and 1$^c$ to the audience. Light which is not polarized in the proper plane will be reflected at the surfaces, such as 11$^a$, and will then enter the opposite surface, such as 11$^b$, and be sent on a circuitous path through the screen, and be largely dissipated. Thus, projector light has an immense advantage in being returned to the spectators from the screen.

A conventional representation of a theatre utilizing the polarized system of projection, and also specially adapted to use the color process to be described later, is shown in Figure 9, where 27 represents a picture screen similar to those described. This, of course, has the property of reflecting light polarized in a certain plane, while absorbing a large proportion, if not all, light polarized in other planes. The light from projector 26 is polarized in such a plane that it will be sent back to the audience by screen 27, while light polarized in other planes will be either absorbed or dissipated in the screen; light polarized in a plane ninety degrees removed from that which is most readily reflected by the screen will be totally absorbed. In order to take full advantage of this fact, all windows such as 28, 28', 29, 29', and lamp globes or shades, such as 30, 30', are provided with polarizing means; this may be easily done by providing them with ridges as previously described in connection with the screens. The light reaching such windows should do so at approximately perpendicular incidence, and other light should be excluded. The polarizing means is so arranged that practically only that light is transmitted which is polarized in a plane at right angles to that which is sent back by the screen. Such light will, therefore, be absorbed by the screen. The vertical lines in 27 and the horizontal ones in the windows and lamps are intended to represent conventionally that there is a difference of ninety degrees in the planes of polarization of the light admitted by the windows, or emitted by the lamps, and the light reflected from the screen, and by means of which the picture is seen. Obviously, the interior of the theatre is seen by light polarized in one plane, while the picture is seen upon the screen by means of light polarized in a plane approximately at right angles to the former. The screen is dark to all but projector light, as it absorbs that from the windows or lamps. If it is desired to take a further precaution, the walls of the theatre may be provided with a ridged surface, similar to that of the screen in Figure 1, and such ridges placed so as to reflect light coming from the windows or lights, and absorb that in other planes. This feature is indicated at 32. A wall paper which is practically suitable for this purpose already exists upon the market; it is not necessary that the angles be such that the light rays will impinge at the polarizing angle, as any angle would have partial polarizing effects. All ribbed or grained surfaces possess the property of reflecting light polarized in a certain plane, and absorbing that polarized in a plane ninety degrees different from the former. Even wood possesses this property, and even though the woodwork in the theatre were not actually ridged, still it could be arranged so that its polarizing properties could be utilized when it is being placed in position by examining it with a Nicol prism, and placing it so that it will reflect light polarized so that it will be absorbed by the screen. In the drawings I have not indicated the actual direction in which the ether particles are vibrating in illustrating the polarizing apparatus, as it would be of little assistance in practical work. All that is necessary in practice is to examine the substance with a Nicol prism, when it can be readily determined what light is refracted or reflected. Or, in making the theatre, the screen 27 could be set up first, and anyone could tell whether a polarizing window light, for instance, were placed correctly or not, by simply turning it around, and observing the positions in which its light was entirely reflected and entirely absorbed by the screen. A person not knowing anything about optics could do this successfully. When a theatre is built according to the description given above, all of its parts will be clearly visible, as in ordinary daylight, but its screen when no picture is projected upon it, will have a dark or black appearance. When a picture is thrown on such a screen, it will be easily visible, as its dark portions or shadows are not illuminated by the illuminants.

Although a determined effort is made to take advantage of total polarization in all the apparatus, still in practice partial polarization will probably be sufficient. In describing ridged surfaces as polarizing means, the object in mind was the cheapness of such means as compared with other polarizing means, such as Iceland spar, etc., which are generally used for such purposes.

I claim as new and desire to protect by Letters Patent:

1. In combination, a projector having means for polarizing light in a definite plane, a screen receiving the polarized light from said projector upon its surface and provided with means for reflecting all light polarized in said plane and refracting more or less light polarized in planes different from said plane.

2. A projecting system, consisting of a polarized light projector, a screen provided with polarizing means receiving the polarized light from said projector upon its surface and which reflects projector light and dissipates and absorbs other light.

3. A projecting system consisting of a polarized light projector projecting polarized light, a screen provided with polarizing means receiving polarized light from said projector upon its surface, and which reflects light polarized in the same plane as projector light and coming from the direction of the projector, and dissipating other light.

4. A projecting system consisting of a projector projecting plane polarized light, a screen receiving said light whose surface is provided with ridges having flat sides so inclined as to reflect light coming from the direction of said projector back in the general direction of said projector, and refract light coming from directions at an angle to direction of said projector, said ridges possessing geometric uniformity.

5. A projecting system consisting of a screen coacting with a projector projecting polarized light, said screen having a totally reflecting surface at its rear, capable of reflecting light from said projector, and more or less refracting light differing from said projector light in polarizational and directional characteristics.

6. A projecting system consisting of a projector projecting polarized light upon a screen having a ridged surface, the sides of the ridges of said ridged surfaces being so inclined as to reflect light from direction of projector and to refract more or less other light, and a light absorbing medium placed at rear of said screen to absorb light refracted by said screen.

7. A projecting system consisting of a projector projecting light polarized in a definite plane upon a light transmitting screen having a totally reflecting surface consisting of a plurality of geometrically uniform ridges provided with flat surfaces inclined at an angle of approximately forty five degrees that light from said projector is incident upon said surfaces at such angle as to be totally reflected back in the general direction of said projector, while transmitting light incident upon said screen at an angle to normal.

8. A projecting system consisting of a projector projecting light polarized in a definite plane upon a translucent or transparent screen having a totally reflecting surface which reflects light of said projector, while transmitting light coming to the said screen at an angle to the normal, and a light absorbing medium at rear of screen to absorb said transmitted light.

9. A projecting system consisting of a projector light so polarized as to be reflected from a ridged surface due to the inclination of sides of said ridges; said surface refracting light polarized in planes other than that of the said projector light.

10. A projecting system consisting of a projector emitting light provided with ridges whose sides are so inclined, a screen polarized in a definite plane that they reflect said light more copiously than light polarized in other planes.

11. A projecting system consisting of a projector emitting light polarized in a definite plane, a screen provided with means for readily reflecting said light and readily absorbing light polarized in other planes; means consisting of planes of transparent material having ridged surfaces, the sides of said ridges being inclined at the most suitable angle, for excluding from screen all light except projector light that will be reflected therefrom.

12. A projecting screen consisting of a plurality of superposed layers of transparent material, each of said layers having a different refractive index, the layers being so arranged that the refractive index decreases in the direction away from the projecting means, a reflecting surface being provided at side of said screen farthest from said projecting means, each of said layers being capable of imprisoning light incident at specific angles of incidence, said imprisoning being by means of the phenomena known to optical science at total internal reflection, said layers completely transmitting light at normal incidence to be reflected by said reflecting surface.

13. A projection screen having polarizing ridges at its surface and reflecting surface at its rear, and a light absorbing medium at its sides.

14. A projection screen having a polarizing surface provided with a plurality of uniformly inclined planes capable of reflecting light polarized in the plane of incidence and refracting other light, layers of different refractive indices at rear of said polarizing surface, to imprison by total reflection light refracted at said polarizing surface, a reflecting surface at rear to reflect light refracted at said polarizing surface, and light absorbing layers at sides, to absorb light not refracted at said polarizing surface.

15. A transparent screen having a ridged surface which is totally reflecting for light at normal incidence on said screen and consisting of a plurality of inclined planes which reflect light coming from the direction of the projector and transmit that coming from other directions.

16. A screen consisting of a transparent or translucent medium having a totally reflecting surface, consisting of ridges whose sides are inclined to the surface of the screen at an angle of 45 degrees.

17. A projecting screen consisting of a transparent medium having a surface which is totally reflecting for light coming to said screen at normal incidence, said surface being situated at rear of said screen and consisting of a plurality of geometrically uniform ridges, whose flat sides are inclined at an angle of approximately 45 degrees to normal, said ridges permitting the passage of light not at normal incidence on said screen, a light absorbing means behind said screen to absorb all light transmitted by said screen.

18. A transparent or translucent projection screen having a ridged totally reflecting surface, the sides of said pyramids, or ridges being substantially at an angle of forty-five degrees to normal.

19. A projection screen having ridges on surface adjacent projector, the sides of said ridges constitute a plurality of planes which meet projector light at substantially the polarizing angle.

20. A projection screen composed of several layers of different refractive index; the surface adjacent the projector being provided with polarizing means, and the surface farthest from said projector being reflecting, light absorbing means being provided at the sides.

21. A projection screen composed of several transparent or translucent layers of different refractive index, having light reflecting means at the rear and light absorbing means at the sides.

22. A projection screen provided with means for reflecting light polarized in the plane of incidence, and refracting light not so polarized.

23. A projection screen consisting of a transparent or translucent body whose surface adjacent projector is provided with ridges whose surfaces are inclined so as to meet projector light at approximately the polarizing angle.

24. A projection screen having a surface provided with ridges whose sides are inclined at 90 degrees to each other.

25. A theatre whose light sources are provided with light polarizing means, which polarize light in a definite plane, a projection screen located in said theatre and provided with a surface consisting of ridges whose sides are inclined at approximately the polarizing angle, said screen being so placed as to transmit light from said light source, and permit it to impinge upon a light absorber, in order thereby to give a dark appearance to said screen when light from said light source impinges thereon.

26. A theatre whose interior surfaces are provided with light polarizing means, such as ridges whose sides are inclined at the polarizing angle, a projector located in said theatre provided with means for polarizing light in such definite plane as to be reflected from the surface of a projection screen located in said theatre and having a surface consisting of ridges inclined at approximately the polarizing angle, and which transmit light polarized in a plane corresponding to that of light reflected from said projector.

27. A theatre containing a projector provided with means for polarizing its light in a definite plane, a screen receiving light from said projector upon its surface which is provided with a plurality of uniformly inclined planes and acting to reflect projector light due to its plane of polarization and therefore all light polarized in the same plane as said projector light, and interior surfaces and light sources also provided with a plurality of inclined planes, said planes in the case of said light sources acting to polarize their light in a plane substantially ninety degrees removed from the plane of said projector light and therefore causing it to be absorbed by said screen; the planes on said interior surfaces acting to reflect only that light which will be absorbed by the screen.

28. A theatre containing a projector provided with means for polarizing its light in a definite plane, a screen receiving light from said projector and provided with means such as a plurality of planes inclined at such angle as to reflect light polarized in the same plane as the projector light and refract light polarized in other planes, light sources provided with means such as planes inclined at substantially the polarizing angle for polarizing their light in such plane that when incident upon said screen they will be refracted thereby, and interior surfaces provided with a plurality of inclined planes acting to reflect light polarized in a plane so that when incident upon said screen, it will be refracted thereby.

29. A theatre having illuminators provided with light polarizing means, such as a plurality of planes inclined at the polarizing angle located on surface of said illuminators and acting to polarize light in such plane that it is absorbed by light polarizing means consisting of planes inclined at the polarizing angle located on the surface of a projection screen located in said theatre in order that said screen may thereby have a dark appearance.

30. A projecting system consisting of a projector provided with polarizing means consisting of a bundle of thin plates of glass inclined to the light rays at the polarizing angle acting to polarize the light in the plane of incidence, a screen receiving said light upon its surface which is provided with a plurality of inclined planes which reflect said light due to its being polarized in the plane of incidence and which refract light polarized at an angle to the plane of incidence.

31. A theatre having a plurality of illuminators which polarize light in a definite plane, a projector in said theatre provided with means for polarizing light in such definite plane as to be ninety degrees removed from the plane of polarization of light from said illuminators when both lights impinge upon a projection screen located in said theatre which is provided with means for transmitting light polarized in a plane corresponding to that of the light from said illuminators, and reflect light polarized in a plane corresponding to that of said projectors.

32. A theatre having a plurality of illuminators which polarize light in a definite plane, a projector in said theatre provided with means for polarizing light in such definite plane as to be ninety degrees removed from the plane of polarization of light from said illuminators when both lights impinge upon a projection screen located in said theatre which is provided with means for transmitting light polarized in a plane corresponding to that of the said illuminators and reflect light polarized in a plane corresponding to that of said projectors, the interior surfaces of said theatre being provided with means for absorbing light polarized in a plane corresponding to that of the light reflected from said projector.

ALOYSIUS J. CAWLEY.